July 2, 1968 J. L. MANNIX 3,390,795
LIFTING AND TRANSPORTING DEVICE
Filed June 30, 1966 2 Sheets-Sheet 1

INVENTOR.
JAMES MANNIX

BY Woodard, Weikart, Emhardt & Naughton
Attorneys

July 2, 1968  J. L. MANNIX  3,390,795
LIFTING AND TRANSPORTING DEVICE
Filed June 30, 1966  2 Sheets-Sheet 2

INVENTOR.
JAMES MANNIX

BY Woodard, Weikart, Emhardt & Naughton
Attorneys

United States Patent Office 3,390,795
Patented July 2, 1968

3,390,795
LIFTING AND TRANSPORTING DEVICE
James L. Mannix, 115 W. 34th St.,
Indianapolis, Ind. 46208
Filed June 30, 1966, Ser. No. 561,878
8 Claims. (Cl. 214—396)

The present invention relates to the transportation and handling of bulky equipment and more particularly relates to an apparatus for lifting and transporting bulky equipment such as heavy transformers.

Many man hours are expended in jobs where bulky equipment must be moved between closely spaced buildings and over narrow, uneven, roadless building sites. A particular problem is encountered when a heavy transformer is to be moved to or set on a transformer pad which is sandwiched between two closely spaced buildings. Similar problems are encountered in the installation of industrial motors and various other equipment such as heating and air-conditioning units. Stone and monument handling also frequently requires that heavy objects be moved in cramped quarters.

A primary object of the present invention is to provide an improved apparatus for handling heavy, bulky equipment.

Another object of the present invention is to provide an apparatus for handling heavy transformers and the like which has maximum maneuverability both in transporting the equipment to be installed to the installation site and in being positioned adjacent the installation site.

It is a further object of the present invention to provide an apparatus for handling heavy transformers and the like which can be easily loaded, pulled to the installation site either by a powered vehicle or manually, and unloaded with a minimum number of man hours.

It is a further object of the present invention to provide an apparatus for transporting heavy equipment to an installation site wherein several men can accomplish in a relatively short time a job that took a crew of men a day to complete.

Further objects of the present invention and the nature thereof will become apparent from the following description taken in conjunction with the accompanying drawings wherein like reference numbers describe elements of like function. While the apparatus of the present invention will be described in conjunction with a heavy transformer, it is adapted to handle heating and air-conditioning units, large stones and monuments, motors and the like.

In accordance with the present invention, there is provided a cart for transporting a heavy transformer to an installation site and lowering it onto its mounting pad. The cart has a frame including removable rear retaining wall means, a removable load carrying surface, front wall means adapted to pivotally receive a front wheel suspension means and side walls. Each of the side walls carries an upright hoist section. A top hoist crossbar is hinged at one section. A hoist arrangement for lifting and lowering the transformer includes a winch mounted to a top surface of one of the side walls, a cable extending from the winch drum and entrained over a pair of pulley wheels which are pivotally mounted between spaced parallel bars of the crossbar, entrained over the pulley wheel of the pulley block and then fixed to the crossbar. The rear wheels are individually mounted.

The full nature of the invention will be understood from the accompanying drawings and the following description and claims.

Figure 1:
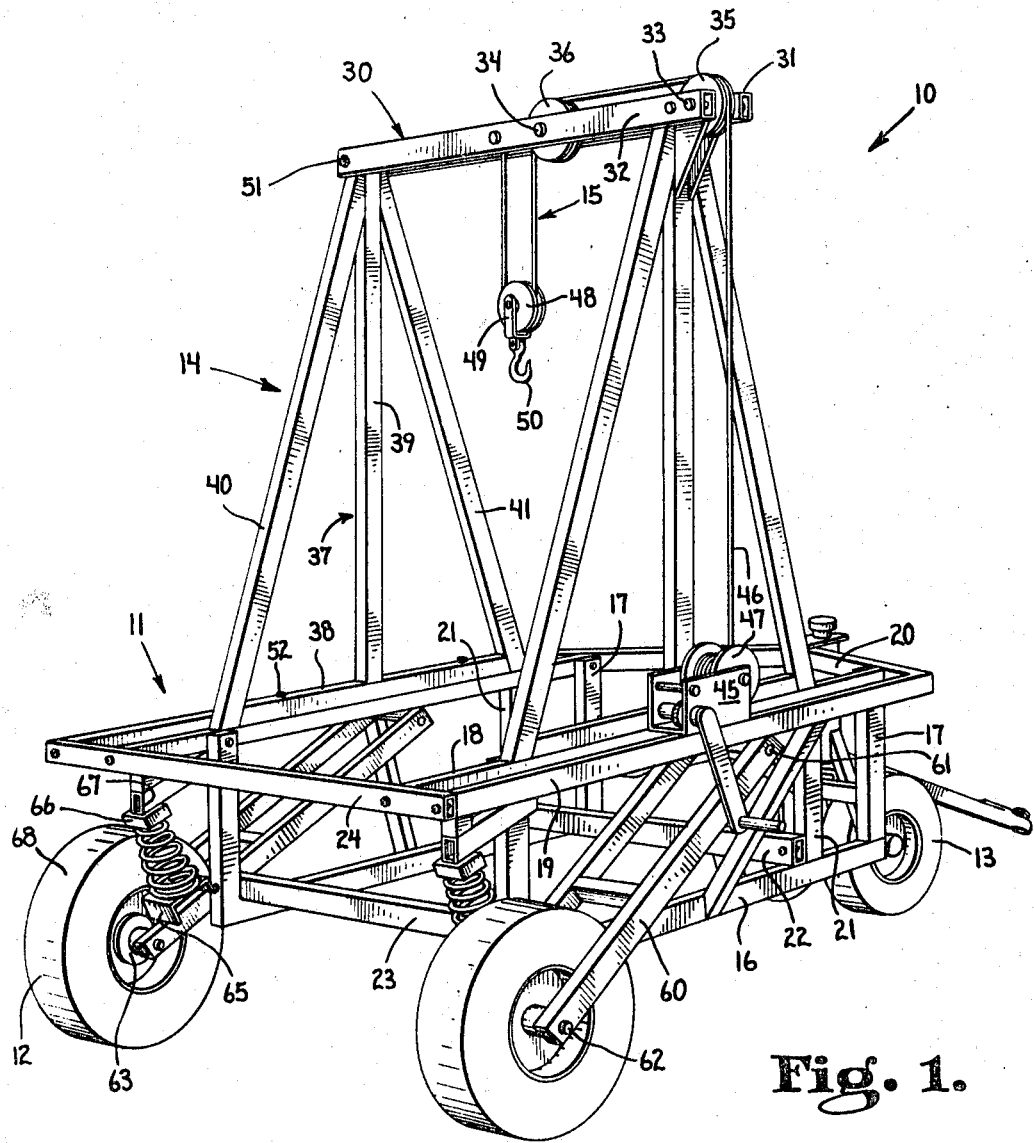
FIG. 1 is a perspective view of the cart of the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The cart 10 generally includes a frame 11 supported by rear wheels 12 and front wheels 13. The frame carries an overhead hoist assembly 14. A block and tackle assembly 15 is associated with the hoist assembly. The frame provides a bed for supporting a transformer and the block and tackle assembly provides a means for lifting the transformer, supporting the transformer when the load carrying surface of the frame has been removed and for lowering the transformer onto its mounting pad.

The cart 10 is utilized to move extremely heavy objects such as transformers weighing 2,500 pounds. Many times, such transformers must be placed on mounting pads which are located in narrow quarters which cannot be reached by a powered vehicle. The cart embodying the spirit of the present invention is constructed so that several men can manually move the cart when it is carrying a heavy object. Therefore, to save on weight of the overall structure, frame 11, in its preferred embodiment, is skeletal rather than solid.

The side wall members of the cart 10 generally comprise a first substantially C-shaped member 16 having arms 17 extending upwardly. A horizontal bar 18 is coupled to the distal ends of arms 17 to form a generally rectangular side wall construction. The rearward end of horizontal bar 18 extends beyond the C-shaped member 16. A second vertical bar is spaced outwardly from said first vertical bar 18. The second vertical bar 19 is held in position by a plurality of support means not shown and is the same length as bar 18. The V-shaped top bar 20 of a front wall means extends beyond the first bar 18 and is coupled to the second bar 19. An auxiliary vertical support means is spaced between bar 16 and bar 18 parallel with arm 17 of the C-shaped member 16. A first removable load carrying means 22 is disposed across the first and second side walls and coupled to support number 21. A second removable load carrying means 23 is placed across the end corners of C-shaped member 16 and affixed thereto. A removable bar 24 is affixed to the end of bars 18 and 19 to provide a removable horizontal back wall member. Members 24, 23 and 22 are removable, so that the cart may be wheeled to the site where the transformer is to be installed, the members 22, 23 and 24 removed and the cart rolled over the mounting pad itself. This construction eliminates the necessity for a crew of men to wrestle for many hours with a heavy transformer to get it to the site of installation and onto its mounting pad.

The overhead hoist assembly 14 comprises a top hoist crossbar 30 which includes a pair of spaced parallel bars 31 and 32 having spaced pulley mounting axles 33 and 34 journaled therethrough for rotatably receiving a first pulley 35 and a second pulley 36. The top hoist crossbar 30 is supported by a pair of spaced side hoist members 37 which include a bottom beam 38 having a centrally located perpendicular member 39 and a diagonally disposed member 40 and 41 on either end of the beam 38. Members 40 and 41 are slanted inwardly toward the central member 39 so as to join the central member 39 at its distal end, thereby forming an inverted V-shaped structure with member 39 bisecting the central vertical axis. The spaced parallel bars 31 and 32 straddle the apex of the inverted V-shaped structure and are coupled thereto. The block and tackle assembly 15 includes a winch 45 coupled to members 18 and 19 of one of the side wall structures of the frame. A cable 46 extends from a winch drum 47 and is entrained over the first pulley 35 and a second pulley wheel 36 and is further entrained over pulley wheel 48 of a pulley block 49 and is finally coupled or affixed to the top cross beam 30. A hook 50 depends downwardly from the pulley block 49. The attaching means 51 of the crossbar 30 are removable to allow the crossbar to pivot outwardly for loading purposes. The crossbar and hoist assembly may also be completely removed by removing fastening means 52 should the cart have to traverse low areas.

Since the cart of the present invention must straddle the site where the transformer is to be installed, it is obvious that a rear axle is not feasible. Therefore, each of the rear wheels 12 are independently suspended from the frame. This is accomplished by a substantially H-shaped frame 60 affixed at a first end to one of the side walls by means 61. The wheel 12 is rotatably received between the leg members of the H-shaped frame adjacent a second end of said frame. An axle means 62 is journaled through said frame for rotatably receiving the wheel 12 therebetween. A taper rear wheel roller bearing 63 associated with the wheel facilitates the rolling or towing of said apparatus.

To ensure flexibility, the rear wheels are individually pivotable and individually mounted for better handling over uneven terrain. The independent suspension leads to increased stability of the cart. The wheels 12 are spring loaded to accomplish this. A first spring mounting block 65 is received on an inner leg of H-shaped frame 60 and a second spring mounting block 66 is affixed to a support means 67 of the frame 11. A coil spring 68 is disposed between the blocks 65 and 66. As can be seen from the drawings, there are heavy duty coil springs to adapt to the extremely heavy loads to be handled by the cart 10.

Figure 2:
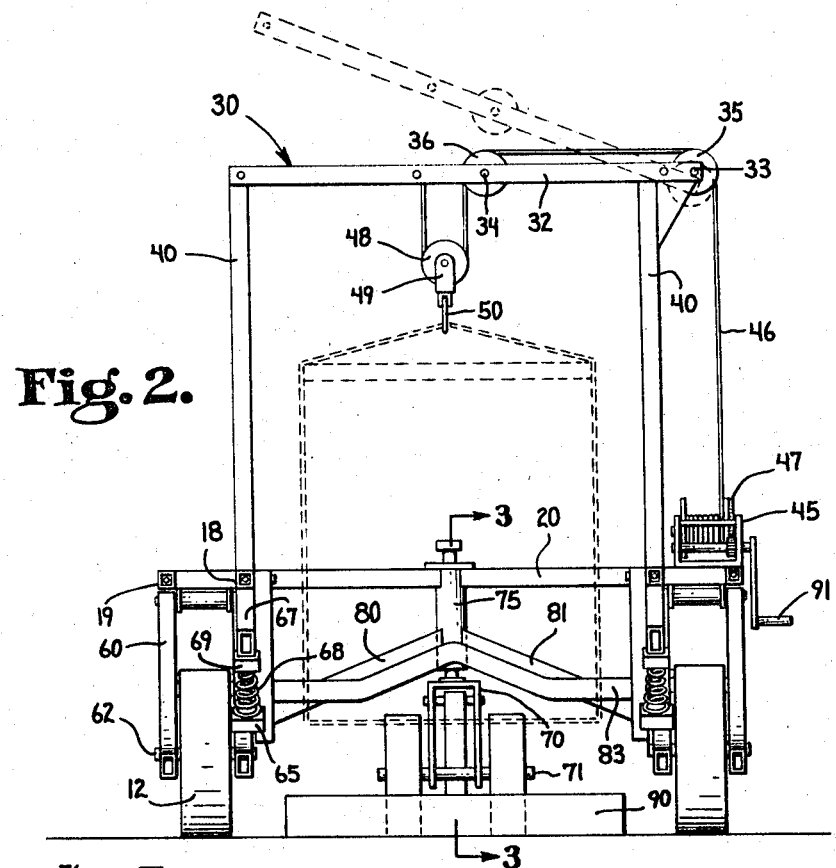
FIG. 2 is an end elevational view of the cart showing a transformer supported thereon.
Figure 3:
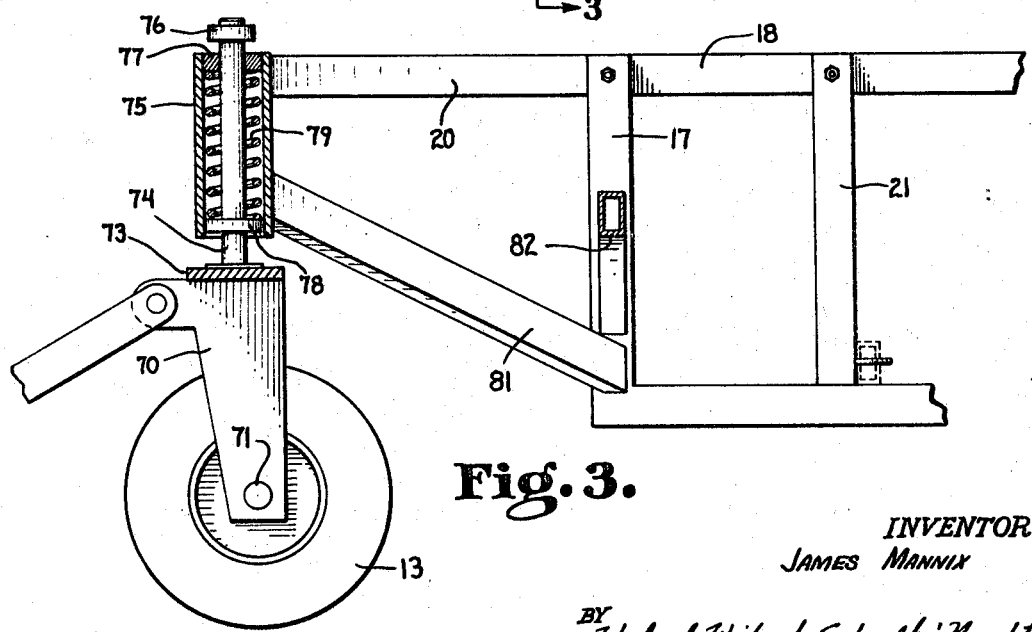
FIG. 3 is a side elevational view of the spring loaded, front wheel construction.

The front wheel assembly is more clearly shown in FIGS. 2 and 3. The front wheel assembly includes a generally U-shaped fork member 70, an axle 71 journaled through the fork member 70 and extending beyond the fork member. A wheel 13 is mounted adjacent each end of the axle and means for retaining the wheel on the axle are secured. A mounting block 73 is provided for mounting a vertical rod 74 to the top of the fork member 70. The front wall member 20 of the frame 11 carries a vertical sleeve 75 for receiving the rod 74. The distal end of the rod extends above the sleeve. A collar 76 is fixed to the distal end of the rod to limit the downward travel of the rod. The rod is rotatably received within the shaft by a bearing 77 in the upper end of the sleeve. A plunger element 78 is affixed to the rod adjacent the lower end of the sleeve. A spring means 79 is disposed between the plunger and the bearing for providing stability over rough surfaces. The fork is then rotatable 360 degrees about its axis enabling the apparatus to turn in its own radius.

The fork structure is braced to the frame by two sets of bracing members. A first diagonal bracing beam 80 extends from one side of the sleeve 70 to the frame and an identical bracing member 81 extends from the other side of the sleeve member to the frame. A second bracing unit 82 is a substantially V-shaped bar with the apex of the V affixed to the sleeve 70. The V-shaped bar 82 terminates in outwardly extending arm members 83 which are coupled to the frame.

FIG. 3 further illustrates the cart positioned over a mounting pad 90. The lower support members 23 and 22 and the rear retaining means 24 have been removed so that the cart could be rolled and positioned over the mounting pad. By rotating the crank 91 the transformer 92, indicated by dotted lines in FIG. 2, can be lowered onto the pad 90.

Thus, the present invention provides a cart which may be used to transport a heavy transformer to its mounting pad. The cart of the present invention may be operated by only several men, whereas a similar operation used to take a crew of men nearly a day to complete. The time in this case is cut down to an hour or two. This cart obviates the need for men physically wrestling with heavy transformers or heavy stones or air-conditioning units or heating units and the like over roadless terrain, through narrow passageways with damage to lawns, shrubbery, sidewalks and property.

While the present invention has been described as applying to transformers, it is easily adaptable to moving and installing heavy motors, air conditioners, heating units, stones and monuments and the like.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. An apparatus for transporting a heavy transformer to a transformer mounting pad and lowering said transformer onto said pad, said apparatus including a frame, said frame forming a bed for supporting said transformer, an overhead hoist assembly mounted on said frame, a block and tackle assembly cooperatively associated with said overhead hoist assembly, first and second rear wheels, means for independently suspending each of said rear wheels from said frame, a fork suspension for mounting first and second front wheels to said frame, and a tongue for coupling said frame to a powered vehicle, said frame comprising: front wall means adapted to receive said fork for pivotally mounting said front wheels to said frame, first and second side walls coupled to said front wall means, removable rear wall means coupled to said side wall means and removable load carrying surface means coupled to said side walls; means for independently suspending a first rear wheel coupled to one of said side walls and identical means for independently suspending a second rear wheel to the opposite side wall, said rear wheels spaced to straddle said transformer mounting pad when said rear wall means and said load carrying surface means have been removed from said frame; said overhead assembly including a first upright hoist section coupled to one of said side walls, a second upright hoist section coupled to said opposite side wall, a top hoist crossbar coupled to said first and second upright hoist sections; said block and tackle assembly including a winch coupled to one of said side walls of said frame, a cable extending from a winch drum and entrained over a first pulley wheel, said pulley wheel cooperatively associated with said top hoist crossbar, said cable entrained over a pulley of a pulley block and affixed to said top hoist crossbar, said block and tackle assembly lifting said transformer, supporting said transformer when said load carrying surface is removed from said frame.

2. An apparatus in accord with claim 1 wherein said means for independently suspending a first rear wheel additionally comprises a substantially H-shaped frame affixed at a first end to one of said side walls, said wheel rotatably received between leg members of said H-shaped frame adjacent a second end of said frame, axle means journaled through said frame adjacent said second end for rotatably receiving said wheel on said axle between said leg members, taper rear wheel roller bearings associated with said wheel for facilitating rolling or towing of said apparatus; a first spring mounting block received on an inner leg of said H-shaped frame, a second spring mounting block coupled to the underside of said side wall adjacent the rear end thereof and a spring means disposed between said first and second spring mounting blocks.

3. An apparatus in accord with claim 2 wherein said spring means is a coil spring.

4. An apparatus in accord with claim 3 wherein said top hoist crossbar additionally comprises a pair of spaced parallel bars having spaced pulley mounting axles journaled therethrough for rotatably receiving said first pulley and a second pulley, said crossbar being hinged at one end thereof, said crossbar further being completely removable and wherein each of said side hoist members have a first, second and a third beam, said first beam coupled to said frame adjacent the front end thereof, said second beam coupled to said frame adjacent the rear end thereof, said third beam coupled to said frame midway between said first and second beams, said third beam extending vertically from and perpendicular to said frame, said first and second beams slanted inwardly so as to join said third beam at its distal end, said first and second beams forming an inverted V-shaped structure with said third beam bisecting the central vertical axis of said V-shaped structure, said spaced parallel bars of said crossbar straddling the apex of said inverted V-shaped structure and coupled thereto.

5. An apparatus in accord with the claim 4 wherein said front wheel assembly additionally comprises a generally U-shaped fork member, an axle journaled through said fork member adjacent the lower end thereof, each end of said axle extending beyond said fork member, a wheel mounted adjacent each end of said axle and means for retaining said wheels on said axle, a rod mounted to the top of said fork member; said front wall means of said frame carrying a vertical sleeve for receiving said rod, the distal end of said rod extending above said sleeve, a collar fixed to said distal end of said rod to limit the downward travel of said rod, said rod rotatably received through a bearing in the upper end of said sleeve, a plunger element fixed to said rod adjacent the lower end of said sleeve, and a spring means positioned between said plunger and said bearing for providing stability over rough surfaces, said fork being rotatable 360° about its axis enabling said apparatus to turn in its own radius; and means for bracing said sleeve to said frame.

6. An apparatus in accord with claim 5 wherein said first side wall additionally comprises a first substantially C-shaped member having the arms of said C extending upwardly, the distal ends of said arms having a vertical bar coupled thereto, said bar extending rearwardly beyond the rear arm, said upright side hoist members coupled to the top surface of said bar, means for coupling said first, second and third beams at their lower end to said frame; one end of said bar coupled to a top bar of said front wall means, said top bar extending outwardly beyond said vertical top bar of said side wall, a second vertical top bar of said side wall coupled to the end of said top bar of said front wall means, means for coupling said second vertical top bar to said first vertical top bar, said first and second bars being parallel with respect to each other.

7. An apparatus in accord with claim 6 wherein said frame additionally comprises a vertical support member spaced from the front leg of said C-shaped member and coupled to said side frame, a first removable load carrying means supported on a bottom horizontal member of said side wall, said load carrying means coupled to said vertical support means; and a second load carrying means disposed across the back corners of said C-shaped members and coupled thereto.

8. An apparatus in accord with claim 7 wherein a first diagonal bracing member is disposed between one side of said vertical sleeve and one of said side walls and a second diagonal bracing member is disposed between the opposite side of said vertical sleeve and the other of said side walls, said sleeve having a third bracing member coupled at the rear of said sleeve, said third bracing member including a V-shaped bar, the apex of said V-shaped member coupled to said sleeve, the free ends of said V-shaped member terminating in outwardly extending arm members, each of said arm members coupled to a side wall member.

References Cited

UNITED STATES PATENTS 2,562,189    7/1951    Harris _____ 214—396
3,028,030    4/1962    Wylie _____ 214—396

ALBERT J. MAKAY, *Primary Examiner.*